United States Patent [19]

Eigeldinger et al.

[11] Patent Number: 4,864,429

[45] Date of Patent: Sep. 5, 1989

[54] SYSTEM FOR PROVIDING TRANSMITTER-CONTROLLED ACTUATION OF EQUIPMENT AT THE RECEIVING END OF A COMMUNICATIONS SYSTEM

[75] Inventors: Norbert Eigeldinger; Rolf Laskus, both of Villingen-Schwenningen, Fed. Rep. of Germany

[73] Assignee: Deutsche Thomson-Brandt GmbH, Villingen-Schwenningen, Fed. Rep. of Germany

[21] Appl. No.: 47,437

[22] Filed: Apr. 6, 1987

[30] Foreign Application Priority Data

Aug. 8, 1985 [DE] Fed. Rep. of Germany ....... 3528467
Aug. 5, 1986 [WO] PCT Int'l Appl. ... PCT/EP86/00461

[51] Int. Cl.$^4$ .................. H04N 7/167; H04N 1/00
[52] U.S. Cl. ..................................... 358/349; 380/20; 455/4
[58] Field of Search ............... 380/4 PS, 20; 358/349; 455/4

[56] References Cited

U.S. PATENT DOCUMENTS 4,225,884  9/1980  Block et al. .......................... 380/20
4,635,112  1/1987  Tomioka et al. ..................... 380/20

Primary Examiner—Stephen C. Buczinski
Attorney, Agent, or Firm—Spencer & Frank

[57] ABSTRACT

A system for providing transmitter-controlled actuation of equipment at the receiving end of a communications system by using an identification signal transmitted for the entire duration of a broadcast and characterizing this broadcast. If the equipment has not been started by the identification signal and if the device is actuated at the beginning or during the broadcast, the further operation of the equipment in a predetermined operating mode is controlled using the identification signal. The equipment at the receiving end may be a broadcast receiver, particularly a television or radio receiver, or an audio or video recorder. In a particular embodiment, the identification signal is stored when a record or "quick start" key of a VCR is manually actuated, and recording continues until the current identification signal is no longer the same as the stored signal.

19 Claims, 1 Drawing Sheet

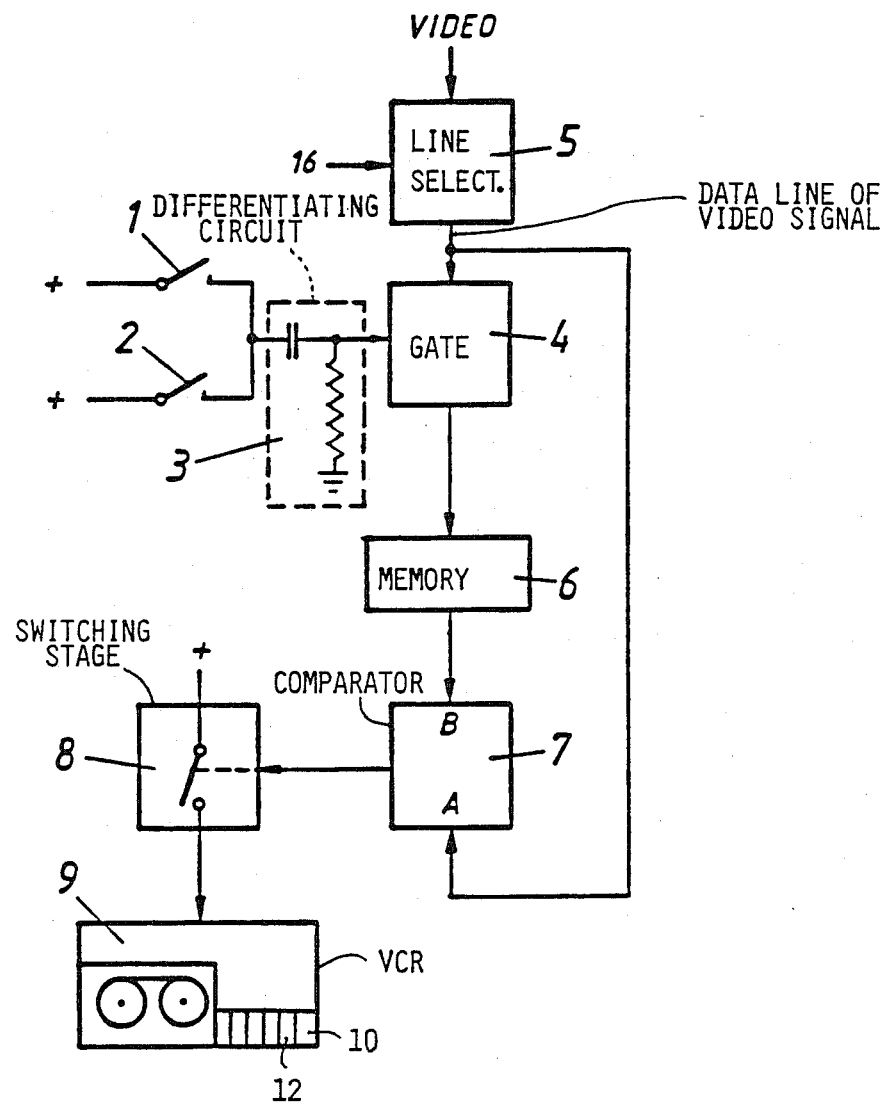

SYSTEM FOR PROVIDING TRANSMITTER-CONTROLLED ACTUATION OF EQUIPMENT AT THE RECEIVING END OF A COMMUNICATIONS SYSTEM

BACKGROUND AND SUMMARY OF THE INVENTION

The present invention relates to a system for providing transmitter-controlled actuation of equipment at the receiving end of a communications system in which an identification system is employed to characterize a broadcast. Such a system serves, for example, to permit accurate recording of a broadcast such as a TV program. The identification signal is transmitted as additional information together with the audio and/or video signal, possibly via a so-called auxiliary carrier, a so-called data line in the video signal or the like.

It is the object of the invention to provide a device with which the user is able to easily operate equipment at the receiving end in a manner adapted to a particular broadcast even if operation of the equipment was not started by the identifying signal.

This is accomplished by providing a circuit in which, after the equipment has been started without relying on the identification signal, further operation of the equipment in a predetermined operating mode is controlled using the identification signal.

The device according to the invention offers the advantage of keeping the equipment at the receiving end in the predetermined operating mode for essentially precisely the duration of the broadcast being received at the moment when the equipment was activated.

This may advantageously result in a reduction of the consumption of electric energy. Furthermore, in the case of recorders in particular, the invention results in a reduction of the wear of moving parts and/or better utilization of the record carriers, for example audio or video tapes, cassettes, diskettes or the like.

Further advantages, features and details of the invention will become evident from the description below.

BRIEF DESCRIPTION OF THE DRAWINGS

The video recorder (VCR) 9 shown in the FIGURE includes a control panel (not shown in detail) having a key 10 for the recording mode ("record key") and a key 12 for the so-called "quick start". When the record key 10 is depressed, video recorder 9 is set into the recording mode until another selection is made, while depressing the quick start key 12 sets the recorder 9 into the recording mode for a certain period which can be set, for example, in 30-minute increments.

Actuation of the record key 10 or quick start key 12 simultaneously closes a switch 1 or 2, respectively, thus placing a positive voltage + across a differentiating circuit 3. Circuit 3 is composed of a capacitor and a resistor connected to ground. The pulse then generated via differentiating member 3 briefly opens a gate 4 for a video signal present at the input of a line selector 5. Line selector 5 selects a so-called data line, which includes an identification signal characterizing a particular broadcast, or TV program. In Europe the sixteenth line of the video signal is selected as the data line, and the identification signal characterizing a particular broadcast is also called a video program system or VPS signal.

Data contained in this identification signal is stored in a memory 6. It is not necessary that all data contained in the identification signal be written into the memory 6. For example, the data characterizing the transmitting station which is being received, or the associated country of the transmitting channel, may be left out if no channel changes are made during the recording mode of video recorder 9.

For the entire duration of the respective broadcast, the identification signal characterizing this broadcast does not change. The data contained in the identification signal (or the data in the identification signal deemed necessary in the sense mentioned) above are fed to an input A of a digital comparator 7. The data stored in a memory 6 are present at another input B of comparator 7.

As long as the information present at the two inputs A and B is identical or, as mentioned above, the data of interest in the present case is identical, comparator 7 holds the video recorder 9 in the recording mode. For example, a switching stage 8 which has previously been activated in a manner not shown in detail in the drawing, can be employed, the switching stage 8 being connected to a voltage supply.

As soon as the identification signal changes or data of interest therein changes, for example because the program is finished or interrupted or there is some interference in the transmission, a comparison of the data present at inputs A and B of comparator 7 becomes negative. Thus, comparator 7 turns off the recording mode in the desired manner by way of switching stage 8, and perhaps even turns off the video recorder 9 as a whole.

It will be apparent that various modifications and adaptions of the embodiment described above are possible. For example, the data characterizing the broadcast could be continuously newly written into the memory 6 until the VCR 9 is actuated, with the last data written in remaining in memory. Furthermore, operation of VCR 9 could be stopped when the data stored in memory 6 does not coincide with the corresponding data of the identification signal for a period longer than a predetermined period of time. Moreover, operation of the VCR 9 can be interrupted if a predetermined identification signal which identifies an interruption is transmitted from the transmitting end of the communications system, with operation of the VCR 9 in the recording mode being restarted if the data stored in memory 6 again coincides with the corresponding data of the identification signal characterizing the broadcast. Additionally, the invention can be adapted to audio recorders, and to controlling the play mode of broadcast receivers such as radios or televisions.

What is claimed is:

1. A device for providing transmitter-controlled actuation of equipment at the receiving end of a communications system in which an identification signal is employed to characterize a broadcast, comprising:
    first means, at the receiving end, for starting the equipment without relying on the identification signal, and
    second means, at the receiving end and operable when the equipment has been started by the first means, for controlling the further operation of the equipment in a predetermined operating mode by using the identification signal, the second means including
        a memory,
        third means for initially storing only initially received data corresponding to at least a portion of the identification signal in the memory when the equipment is started by the first means, and fourth means for comparing the stored data with the corresponding data of a subsequently received identification signal and, for the entire time that the stored data coincides with the corresponding data in the subsequently received identification signal, causing the equipment to be operated in the predetermined operating mode.

2. A device according to claim 1, wherein the fourth means comprises means for keeping the equipment at the receiving end in the predetermined operating mode only as long as the stored data coincide with the corresponding data of the subsequently received identification signal.

3. A device according to claim 1, wherein the third means comprises at least one switch which is actuated when the equipment is started by the first means.

4. A device according to claim 1, wherein the equipment at the receiving end is a recording device, and wherein the predetermined mode of operation is the recording mode.

5. A device according to claim 4, wherein the first means comprises a key for quickly initiating the recording mode.

6. A device according to claim 1, wherein the equipment at the receiving end comprises means for receiving a broadcast signal.

7. A device according to claim 6, wherein the signal is a television signal.

8. A device according to claim 4, wherein the recording device is a VCR.

9. A circuit for controlling an entertainment apparatus which is responsive to a received signal having a sequence of program segments, the receives signal including an identification signal portion which characterizes each program segment as long as the respective program segment lasts and which changes when one program segment is followed by the next program segment, the entertainment apparatus having first and second states and having manually operable control means for shifting the entertainment apparatus from the first state to the second state, said circuit comprising:

first means for initially storing at least part of the identification signal portion of only the initially received signal when the control means is manually operated to shift the entertainment apparatus from the first state to the second state; and second means for comparing the at least part of the identification signal portion stored in the first means with a corresponding at least part of the identification signal portion of a subsequently received signal, and for returning the entertainment apparatus to the first state when a program segment ends.

10. The circuit of claim 9, wherein the first name comprises a memory, a switch which is actuated when the control means is manually operated, and means for storing at least part of the identification signal portion of the received signal in the memory when the switch is actuated.

11. The circuit of claim 10, wherein the second means comprises a comparator having an input port which receives the contents of the memory and another input port which receives the corresponding at least part of the identification signal portion of the subsequently received signal.

12. The circuit of claim 9, wherein the second means comprises a comparator having an input port which receives the at least part of the identification signal portion stored in the first means and another input port which receives the corresponding at least part of the identification signal portion of the subsequently received signal.

13. The circuit of claim 9, wherein the entertainment apparatus comprises means for recording information carried by the received signal.

14. The circuit of claim 13, wherein the received signal is a video signal and the means for recording is a VCR.

15. A circuit for controlling an apparatus for recording information carried by a received signal having a sequence of program segments, the received signal including an identification signal portion which characterizes each program segment as long as the respective program segment lasts and which changes when one program segment is followed by the next program segment, the apparatus having a recording mode and a non-recording mode and having a record key which is manually operable to shift the apparatus from the non-recording mode to the recording mode, comprising:

first means for storing at least part of the identification signal portion of only the initially received signal when the record key is manually operated to shift the apparatus from the non-recording mode to the recording mode; and second means for comparing the at least part of the identification signal portion stored in the first means with a corresponding at least part of the identification signal portion of the received signal, and for returning the apparatus to the non-recording mode when a program segment ends.

16. The circuit of claim 15, wherein the first means comprises a memory, a switch which is actuated when the record key is manually operated, and means for storing at least part of the identification signal portion of the received signal in the memory when the switch is actuated.

17. The circuit of claim 16 wherein the second means comprises a comparator having an input port which receives the contents of the memory and another input port which receives the corresponding at least part of the identification signal portion of the subsequently received signal.

18. The circuit of claim 15, wherein the second means comprises a comparator having an input port which receives the at least part of the identification signal portion stored in the first means and another input port which receives the corresponding at least part of the identification signal portion of the subsequently received signal.

19. The circuit of claim 15, wherein the received signal is a video signal and the apparatus for recording information is a VCR.

* * * * *